United States Patent [19]

Eschbaugh et al.

[11] 3,847,421
[45] Nov. 12, 1974

[54] QUICK CONNECT TUBE COUPLING JOINT

[75] Inventors: John T. Eschbaugh, Chesterland;
 David N. Mooney, Chagrin Falls,
 both of Ohio

[73] Assignee: Parker-Hannifin Corporation,
 Cleveland, Ohio

[22] Filed: Nov. 24, 1972

[21] Appl. No.: 308,974

[52] U.S. Cl. ................. 285/353, 285/354, 285/379,
 285/DIG. 25
[51] Int. Cl. ............................................ F16l 19/00
[58] Field of Search ...... 277/189; 285/39, 233, 319,
 285/347, 374, 379, DIG. 22, 353, 354, 357,
 231, 356, DIG. 25

[56] References Cited
UNITED STATES PATENTS

| | | | |
|---|---|---|---|
| 115,917 | 6/1871 | Wharton | 285/319 X |
| 1,882,308 | 10/1932 | Weston | 277/189 |
| 2,023,898 | 12/1935 | Olson | 285/231 X |
| 2,444,888 | 7/1948 | Baumgardner | 285/DIG. 22 |
| 2,490,363 | 12/1949 | Lang | 285/379 X |
| 2,550,591 | 4/1951 | Parsons | 285/374 X |
| 3,092,404 | 6/1963 | MacWilliam | 285/356 X |
| 3,565,467 | 2/1971 | Haldopoulos et al. | 285/319 X |
| 3,673,541 | 6/1972 | Volinskie | 285/319 X |
| 3,711,125 | 1/1973 | Dehar | 285/319 X |
| 3,751,078 | 8/1973 | O'Brian et al. | 285/374 |

*Primary Examiner*—Paul R. Gilliam
*Assistant Examiner*—David H. Corbin
*Attorney, Agent, or Firm*—John N. Wolfram

[57] ABSTRACT

A tube coupling joint in which a beaded tube with a packing ring and a collet with spring fingers mounted thereon is attached to a nut and body by simply pushing the tube into the nut and body. Upon such insertion the collet fingers spring radially behind a shoulder in the nut to prevent withdrawal of the tube. Disassembly is accomplished by unthreading the nut from the body. The packing ring is held in place on the tube by a spring ring.

11 Claims, 6 Drawing Figures

PATENTED NOV 12 1974 3,847,421
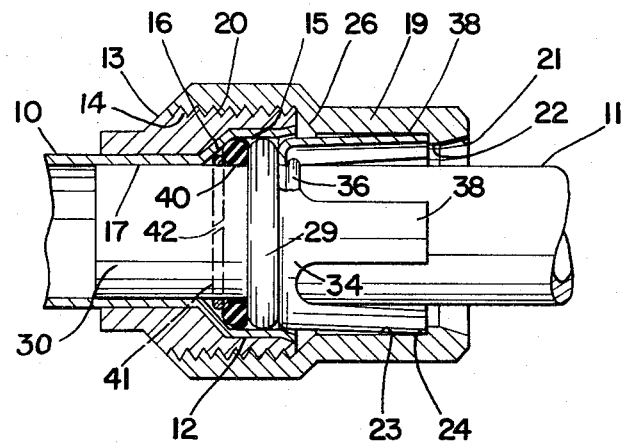
Fig. 1
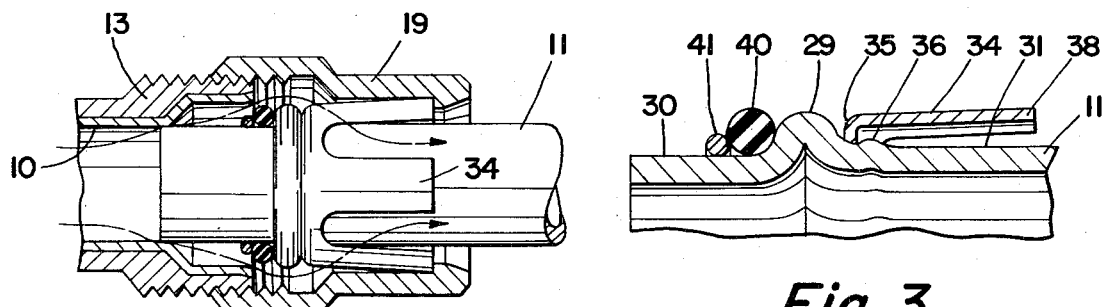
Fig. 2
Fig. 3
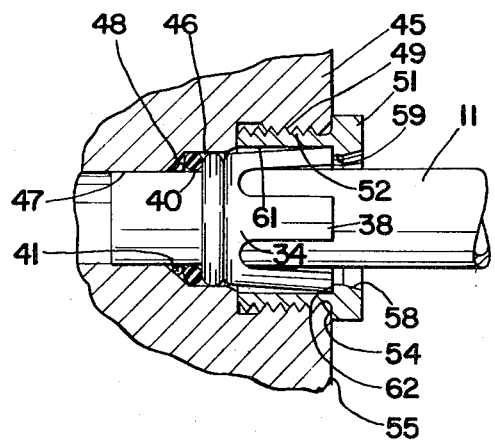
Fig. 4
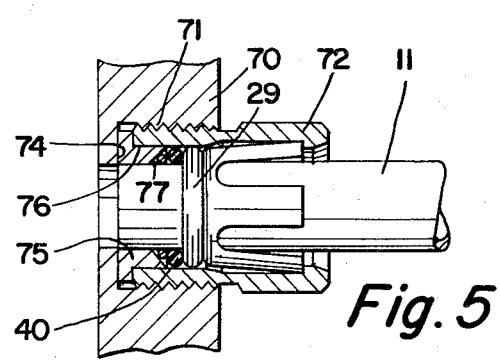
Fig. 5
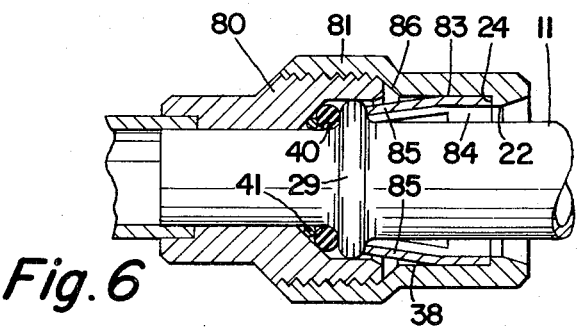
Fig. 6

3,847,421

QUICK CONNECT TUBE COUPLING JOINT

BACKGROUND OF THE INVENTION

In high production final assembly operations, as for automotive air conditioning units, it is highly desirable to accomplish assembly of tubing lines to compressors and other components in as little time as possible. Toward this end tubing lines and coupling components are prefabricated and preassembled as much as possible so that the coupling operation on the final assembly line will be simple and quick.

Presently, tube couplings such as shown in U.S. Pat. No. 3,092,404 are used in such production lines but these require that the assembler thread a tube coupling nut onto the body on the final assembly line.

Other couplings, such as shown in U.S. Pat. No. 3,453,005 permit assembly of the tube by a simple push of the tube, with the holding devices previously assembled thereon, into the coupling body. However, such couplings employ a pair of generally U shaped spring clips that require a bulky shell and which require considerable clearance for disassembly.

Another consideration in connecting tube couplings during final assembly is the problem of preassembling the packing ring to the tube and to retain it on the tube until final assembly is accomplished so that the packing does not get lost.

SUMMARY OF THE INVENTION

The present invention provides a tube coupling in which the nut and body are preassembled to each other and in which all the components other than the nut and body may be preassembled upon a beaded tube so that it is only necessary to push the tube subassembly into the nut and body on final assembly. Also, there is a means for holding the packing ring in its preassembled position on the tube so that it will not drop off before final assembly.

These functions are accomplished by prethreading a nut upon the body and by preassembling a collet having spring fingers to the beaded tube. Also preassembled to the tube against one side of the bead is a packing ring which is held in place by a spring ring that frictionally grips the tube. The collet is pre-anchored to the tube behind the bead and the spring fingers deflect radially inwardly to permit insertion of the collet into the nut by an axial push on the tube and then spring outwardly behind a shoulder in the nut to prevent withdrawal therefrom.

The coupling is small in bulk, of light weight, and is easily disassembled by unthreading the nut and pulling the tube from the body. The spring ring stays in place during disassembly for retaining the packing so that it will not be lost. The parts are so proportioned that the seal provided by the packing ring is broken before the nut is completely unthreaded from the body, thus providing a safety feature in that pressure can be bled from the line before the nut is completely detached from the body.

BRIEF DESCRIPTION OF THE DRAWING

FIG. 1 is a cross section view of one form of the coupling.

FIG. 2 is a view like FIG. 1 showing how pressure may be bled from the line.

FIG. 3 is an enlarged fragmentary cross section view showing how the collet is attached to the tube.

FIGS. 4, 5 and 6 are cross section views of modified forms of the coupling.

DESCRIPTION

In the FIG. 1 form of the coupling, there is a tube 10 to which another metal tube 11 is to be attached. Tube 10 is expanded at its end as at 12 to closely fit within a body member 13, and in effect become a part thereof. Body 13 has an external thread 14 thereon. Alternatively, body 13 can be a tube fitting body with another thread for attachment to the housing of a compressor or other component, or it may be a portion of such housing. In either of these cases tube 10 is omitted and the body portion 13 is internally machined with dimensions corresponding to the inside dimensions of the expanded tube 10.

Tube 10 has a cylindrical enlarged bore 15 chamfered at its outer end and terminating at a conical seat 16 that is preferably formed at an angle of about 45° and which leads to the interior 17 of tube 10.

The joint includes a nut 19 having an internal thread 20 and a chamfer 21 at its back end that leads to a bore 22. There is also a counterbore 23 larger in diameter than bore 22 to form a transverse shoulder 24. There is another chamfer 26 between counterbore 23 and thread 20.

As best shown in FIG. 3, tube 11 has an external bead 29 formed thereon at a location spaced from the front end of the tube. Preferably, the portion of the tube 30 forward of the bead 29 has been swaged to a slightly smaller diameter than the normal diameter 31 of the tube so as to facilitate maintaining of thread 14 of minimum diameter.

A collet 34 is preassembled upon tube 11, preferably at the same time that bead 29 is formed. Collet 34 has a continuous flange portion 35 abutted against the back face of bead 29 and anchored in place by an outwardly swaged portion 36 of the tube. Collet 34 has a series of circumferentially spaced spring fingers 38 extending axially backwardly and radially outwardly from flange 35.

A resilient packing ring 40, here shown in the form of an O ring, is preassembled on the forward portion 30 of the tube against the front part of bead 29 and is held in place by a metallic spring ring 41, split as at 42, that has a tight frictional grip upon tube 11.

As shown in FIGS. 1 and 2, collet flange 35 has substantially the same diameter as bead 29 and both are a close sliding fit within cylindrical bore 15 of the tube 10. O ring 40 preferably initially projects to a slightly larger diameter than bead 29 and is deformed slightly when inserted into bore 15 so that it will sealingly engage bore 15 and cylindrical portion 30 of tube 11. The parts are so proportioned that in the completed joint, as shown in FIG. 1, with nut 19 threaded onto body 13 until the outer end of the latter seats on nut chamfer 26, the free ends of fingers 38 will be against nut shoulder 24 and packing 40, if desired, will be deformed into additional sealing engagement with chamfer 16 and bead 29.

To assembly the coupling joint of FIG. 1, nut 19 is preassembled to body 13, which has tube 10 swaged thereinto, before these parts are brought to the final assembly line. Likewise, tube 11 with collet 34 thereon is prefabricated to form bead 29 and bead 31 for locking collet 34 in place and for slightly reducing front end 30 of the tube. O ring 40 is then put into place and split spring ring 41 is slipped over tube end 30 to hold O ring 40 against bead 29. The parts are now ready for final assembly.

At final assembly, tube 11, with collet 34, O ring 40 and spring ring 41 in place, as shown in FIG. 3, is inserted into the back end of nut 19. During such insertion, chamfer 21 and nut bore 22 deflect collet fingers 38 radially inwardly and as soon as the fingers have passed through nut bore 22 they spring outwardly to be axially opposite nut shoulder 24 and to engage the same to prevent withdrawal of tube 11 from the joint.

Near the final stage of insertion of tube 11, O ring 40 may, if desired, engage chamfer 16 and be axially deformed somewhat between the chamfer and bead 29 to exert a backward pressure upon tube 11 through bead 29 to hold the back edges of spring fingers 38 tightly in conect with nut shoulder 24 so that the tube is not loose in the joint. Alternatively, the parts may be so proportioned that collet fingers 38 spring behind shoulder 24 before O ring 40 engages seat 16. In such case the tube may be a little loose in the axial direction but this is not detrimental. Spring ring 41 maintains its position next to O ring 40, chamfer 16 providing a clearance space for ring 41 so that there is little, if any, displacement of ring 41 toward bead 29 on account of contact with body seat 16. Thus there is little, if any, distortion of O ring 40 by ring 41 upon final assembly.

Disassembly of the coupling normally is not accomplished on the final assembly line but may occur at some later time when the unit to which it is attached is being serviced. Disassembly is accomplished by unthreading nut 19 from body 13 and pulling tube 11 from the body. As tube 11 is thus removed from the body, spring ring 41 retains packing ring 40 in its position against bead 29 so that the O ring will not become lost and is in position for reassembly of the coupling. The latter is accomplished by reinserting tube 11 into body 13 and threading nut 19 onto the body until nut chamfer 26 engages the end of body 13. If the nut has been moved backwards off collet 34 during disassembly, chamfer 26 will contract the ends of fingers 38 to permit insertion of the latter into nut bore 23.

During disassembly of tube coupling joints it can be dangerous to make a complete disconnection while there is fluid pressure in the line. The present coupling avoids this by permitting complete withdrawal of the O ring from tube 10 to break the seal and permit bleeding down of the pressure while a substantial number of nut threads are still engaged with the body threads. This is illustrated in finger 2 in which the arrows show the main bleed path.

FIG. 4 shows a modified form of coupling in which the body 45 is part of a housing for compressor or other unit and bores 46, 47 and chamfer 48 correspond to bores 15, 17 and chamfer 16 in tube 10 of FIG. 1. The threads on the body and nut are reversed, that is, body 45 has an internal thread 49 and nut 51 has an external thread 52.

As with the FIG. 1 form of coupling, when the form of FIG. 4 is prepared for final assembly, nut 51 is threaded into body 45 until nut shoulder 54 seats against body face 55. Tube 11 with collet 34, O ring 40 and spring ring 31 preassembled thereupon, is inserted through nut flared opening 58 until O ring 40 engages chamfer 48, at which time spring fingers 38, which had been deflected radially inwardly by nut bore 59, spring outwardly into nut bore 61 to engage nut shoulder 62 to lock the tube into place. Disassembly of the FIG. 4 coupling is likewise accomplished by simply unthreading the nut from body 45 and pulling tube 11, with collet 34, O ring 40 and spring ring 41 in place thereon, from the body.

FIG. 5 shows another form of the joint generally similar to FIG. 4 in that body 70 is part of a housing for a compressor or other unit and has an internal thread 71 to receive an externally threaded coupling nut 72. This form is useful in instances where the housing wall 70 is of limited thickness or where the depth of entry of tube 11 into the housing must be less than in FIG. 4.

In Fig. 5, threaded bore 71 has a flat bottom wall 74 against which a bushing 75, preferably made of a somewhat resilient material such as glass filled nylon, is clamped by nut 72 into sealed engagement with wall 74 and the forward end face of nut 72. The bushing has a close slip fit within nut bore 76 and has a chamfered front end 77 that corresponds to and provides the function of chamfer 48 in FIG. 4. In this case, the nut and bushing are preassembled to body 70 and the tube subassembly is merely inserted through the nut on final assembly in the manner already described. Also, the parts may be proportioned so that packing 40 is out of engagement with chamfer 77, as shown, or compressed into sealed engagement therewith and with bead 29, as desired.

In FIG. 6, housing body 80 corresponds to body 13 of FIG. 1 when tube 10 is made integral with the latter and it has threaded connection with a housing nut 81 that has a small bore 22 and a larger bore 38 with a shoulder 24 therebetween. A collet 83 has a full cylindrical portion 84 anchored in bore 38 against shoulder 24 by press fitting, staking, or other means to prevent movement of collet away from shoulder 24 when tube 11 is not within the housing parts. The collet has a series of circumferentially spaced spring fingers 85 connected to cylindrical portion 84 and which slope radially inwardly in a direction toward the free ends of the fingers so that such free ends will engage bead 29 on tube 11 for retaining the tube within the joint. In this form, shoulder 86 of the nut may be either tapered as shown or it may be normal to the longitudinal axis of the nut. In either case it may engage the outer end of body 80 to limit takeup therebetween.

To assemble the joint of FIG. 6, collet 83 is inserted and anchored in nut bore 83 by press fitting or staking therein and the nut is then threaded onto body 80 to the position shown. O ring 40 and split ring 41 are slipped onto tube 11 and the latter is then inserted through nut bore 22. O ring 40 and bead 29 will engage and expand fingers 85 until they have passed the fingers, at which time the latter will spring inwardly to engage the rear face of bead 29 to retain the tube within the nut. Although the tube may be withdrawn from the nut by inserting a tool (not shown) between the tube and bore wall 22 and expanding the free ends of fingers 85 until they clear bead 29, the preferred method of disassembly is to simply unthread nut 81 from body 80.

I claim:

1. A tube coupling joint comprising first and second housing members detachably connected to each other and forming a chamber, one of the members having an opening and a transverse shoulder, a tube having an end portion extending through the opening into said chamber, said tube having a radial shoulder thereon axially inward of said transverse shoulder, a collet positioned completely on one side of said tube shoulder and axially between said shoulders, said collet having a first end portion engaged with one of said shoulders and a second end portion engaged with the other of said shoulders for retaining the tube within said chamber, said collet including a spring finger that carries one of said end portions, said finger being radially deflectable out of engagement with the respective shoulder, and a resilient packing in sealed engagement with said tube and the other of said members, said sealed engagement with said tube being with said tube shoulder and with a cylindrical portion of the tube adjacent said shoulder, and said one member being so constructed as to be freely movable relative to said tube during detachment of said first member from the second member.

2. The joint of claim 1 in which there is a means completely on said one side of said tube shoulder fixedly anchoring said collet to one of the tube and said one member only at one end of said collet for preventing significant axial movement of said collet thereon.

3. A tube coupling joint comprising a housing having an opening therethrough and a shoulder spaced from an outer end of said opening and extending radially outwardly therefrom; a tube having an end portion extending through said opening into said housing and having a radial projection thereon axially inward of said shoulder, a resilient packing axially between the projection and housing and in sealing engagement with the tube and housing, said sealed engagement with said tube being with said tube projection and with a cylindrical portion of the tube adjacent said projection, a collet fixedly attached to the tube and positioned completely on one side of said projection between the projection and said shoulder, said collet having an inner end in engagement with said projection, said collet having spring fingers connected to said inner end and extending to an outer end of said collet, said fingers at said outer end being normally on a larger diameter than the diameter of said opening at said outer end, and which fingers are radially inwardly deflectable whereby the tube with the collet thereon may be inserted into said opening and the fingers spring outwardly to engage said shoulder to prevent withdrawal of the collet and tube from said housing.

4. The joint of claim 3 in which there is a means on the side of said packing remote from said bead and independent of said collet engaging said cylindrical portion for retaining the packing on the tube when the tube is separate of the housing.

5. The joint of claim 3 in which said collet has a continuous annular flange engaged by said projection and there is a radially outward bulge on the tube on the side of said flange axially opposite said projection and engageable with said flange whereby said projection and bulge anchor said collet against axial displacement on said tube.

6. The joint of claim 3 in which said housing has a bore that receives the projection with a close fit so as to prevent extrusion of the packing therebetweeen.

7. The joint of claim 4 in which said means comprises a split ring frictionally engaging said cylindrical portion, and said housing has a recessed portion axially between the housing and packing that receives said ring.

8. A tube coupling joint comprising a housing having an opening therethrough and a shoulder spaced from an outer end of said opening and extending radially outwardly therefrom, a tube having an end portion extending through said opening into said housing and having a radial projection thereon axially inward of said shoulder, a resilient packing axially between the projection and housing and in sealing engagement with the projection and housing, a collet fixedly attached to the tube and in engagement with said projection and having spring fingers which at their free ends are normally on a larger diameter than the diameter of said opening at said outer end, and which fingers are radially inwardly deflectable whereby the tube with the collet thereon may be inserted into said opening and the fingers spring outwardly to engage said shoulder to prevent withdrawal of the collet and tube from said housing, said housing includes first and second members that are threadedly engaged and one of which members has a sealing surface engaged by said packing to provide said sealed engagement with said housing and the other member has said shoulder, and said threaded engagement is of greater length than the amount of said axial compression of the packing whereby partial unthreading of the members will permit the tube to move away from said one member a distance sufficient to permit the packing to disengage from its contact with said sealing surface while said spring fingers remain in contact with said shoulder, and said members being free to move relative to said tube and collet during said partial unthreading.

9. A tube coupling joint comprising a body having a flow passage, a circular sealing surface and a transverse face, a nut threadedly attached to said body and having a face engaged with said body face, said nut having an opening therethrough, said opening including adjacent bores of differenet diameters to form a radial shoulder therebetween, a tube having one of its ends within said nut and body and having a radially outward bead near said one end and axially spaced from said shoulder, a collet on the tube between said tube and shoulder, said collet having a front end engaged with one side of said bead and having spring fingers extending to the other end of said collet, said fingers at said other collet end when unrestrained being on a diameter larger than the diameter of the smaller of said bores, said fingers being deflectable radially inwardly so as to pass through said smaller bore and which then spring radially outwardly to endwise engage said shoulder to prevent withdrawal of the tube and collet from said nut, and a gasket on said tube and being endwise pressed between said body and the other side of said bead to resiliently urge the tube axially toward said shoulder whereby said spring fingers are pressed against said shoulder, said tube and nut being removable from said body by unthreading of the nut from the body and subsequent pulling of the tube away from the body.

10. A tube coupling joint comprising a body having a flow passage, a circular sealing surface and a transverse face, a nut threadedly attached to said body and having a face engaged with said body face, said nut having an opening therethrough, said opening including adjacent bores of different diameters to form a radial shoulder therebetween, a tube having one of its ends within said nut & body and having a radially outward bead near said one end and axially spaced from said shoulder, a collet on the tube between said bead and shoulder, said collet having a front end engaged with one side of said bead and having spring fingers extending to the other end of said collet, said fingers at said other collet end when unrestrained being on a diameter larger than the diameter of the smaller of said bores, said fingers being deflectable radially inwardly so as to pass through said smaller bore and which then spring radially outwardly to endwise engage said shoulder to prevent withdrawal of the tube and collet from said nut, a gasket on said tube between said body and said bead, said tube and nut being removable from said body by unthreading of the nut from the body and subsequent pulling of the tube away from the body, said nut opening including a cylindrical portion that is sealingly engaged by said gasket and which fits closely over said bead to prevent extrusion of said gasket therebetween.

11. The joint of claim 10 in which said body has a recess and said body includes a bushing located in the recess and against which said gasket is compressed, and said bushing has a portion received within said nut cylindrical portion with a close fit for retaining the gasket between said bushing and said bead.

* * * * *